(12) United States Patent
Bertolini et al.

(10) Patent No.: US 12,320,390 B2
(45) Date of Patent: Jun. 3, 2025

(54) BEARING UNIT

(71) Applicant: AKTIEBOLAGET SKF, Gotenborg (SE)

(72) Inventors: Andrea A Bertolini, Carrara (IT); Fausto Baracca, Massa (IT); Alessio Nebbia Colomba, Pisa (IT)

(73) Assignee: AKTIEBOLAGET SKF (SE)

( * ) Notice: Subject to any disclaimer, the term of this patent is extended or adjusted under 35 U.S.C. 154(b) by 75 days.

(21) Appl. No.: 18/167,975

(22) Filed: Feb. 13, 2023

(65) Prior Publication Data
US 2023/0265888 A1   Aug. 24, 2023

(30) Foreign Application Priority Data

Feb. 21, 2022   (IT) ......................... 102022000003110

(51) Int. Cl.
*F16C 33/80*   (2006.01)

(52) U.S. Cl.
CPC .................................... *F16C 33/80* (2013.01)

(58) Field of Classification Search
CPC .............. F16C 33/7869; F16C 33/7873; F16C 33/7879; F16C 33/7883; F16C 33/80; F16C 33/805; F16C 33/7806; F16C 33/7863; F16C 33/7896
See application file for complete search history.

(56) References Cited

U.S. PATENT DOCUMENTS

| | | | | |
|---|---|---|---|---|
| 2,132,838 | A | * | 10/1938 | Weckstein .............. F16C 33/80 277/419 |
| 4,101,180 | A | | 7/1978 | Anderson et al. |
| 4,379,600 | A | * | 4/1983 | Muller .................... F16C 33/80 384/480 |

(Continued)

FOREIGN PATENT DOCUMENTS

| | | |
|---|---|---|
| CN | 202900933 | 4/2013 |
| CN | 203214652 | 9/2013 |

(Continued)

OTHER PUBLICATIONS

Machine Translation of DE 20204496 (Year: 2002).*

(Continued)

*Primary Examiner* — Alan B Waits
(74) *Attorney, Agent, or Firm* — Reed Smith LLP

(57) ABSTRACT

A bearing unit is disclosed, which includes a new labyrinth sealing device designed for use in the ventilation industry that prevents entry of contaminants therein. The sealing device according to the present disclosure provides a "contactless" sealing device, i.e. one without contacting elements (for example elastomer lips); and a bearing unit with a low frictional torque, due only to the internal geometry and the efficiency of the lubricant, but certainly without any contribution from the sealing devices. The sealing devices comprises a plurality of shields, and wherein the combination and structural orientation of these shields creates a long, narrow labyrinth L with many changes in direction, and therefore a path for external contaminants with significant (Continued)

(Detail A)

head loss. Consequently, any contaminants that make into the bearing unit, passing through the entire labyrinth L, will be negligible.

6 Claims, 2 Drawing Sheets

(56) References Cited

U.S. PATENT DOCUMENTS

| | | | | |
|---|---|---|---|---|
| 4,408,808 A | * | 10/1983 | Redmann, Jr. ...... | F16C 33/6622 |
| | | | | 384/473 |
| 4,978,236 A | * | 12/1990 | Ostling ................ | F16C 35/047 |
| | | | | 384/480 |
| 5,063,966 A | * | 11/1991 | Amico ................ | F16C 33/7846 |
| | | | | 137/625.65 |

FOREIGN PATENT DOCUMENTS

| | | | | |
|---|---|---|---|---|
| DE | 20204496 U1 | * | 6/2002 | ............. F16C 33/78 |
| DE | 10219124683 | | 3/2021 | |
| EP | 0018647 A1 | * | 11/1980 | |

OTHER PUBLICATIONS

Machine Translation of EP 0018647 (Year: 1980).*
International Search Report for corresponding Italy Patent Application No. 10202200003110 dated Oct. 5, 2022.

* cited by examiner (Detail A)

BEARING UNIT

CROSS-REFERENCE TO RELATED APPLICATIONS

This application is based on and claims priority to Italian Patent Application No. 102022000003110 filed on Feb. 21, 2022, under 35 U.S.C. § 119, the disclosure of which is incorporated herein by reference in its entirety.

SUMMARY

The present disclosure relates to a bearing unit suitable for use in manufacturing, and in particular the manufacturing of fans.

In general, conventional bearing units comprise a first component, for example, a radially outer ring, which is secured to a stationary element—generally a containment casing—and a second component, for example, a radially inner ring, which is secured to a rotary element, usually a rotating shaft. In other applications, the radially inner ring is stationary while the radially outer ring is rotary. In any case, in rolling bearing units, the rotation of one ring with respect to the other is made possible by a plurality of rolling bodies, which are positioned between the two surfaces of the components, usually referred to as raceways. The rolling bodies may be balls, cylindrical or conical rollers, needle rollers and similar rolling bodies, as would be appreciated by a skilled artisan.

It is a known practice for bearing units to protect the raceways and rolling bodies of the sealing devices from external contaminants and to create a seal with respect to lubricant. Typically, the sealing devices consist of an elastomer seal co-moulded on a shaped metal shield mounted by interference or chamfer in a seat of the rings of the bearing unit, for example, of the radially outer ring. The seal includes at least one sealing lip, which by means of frictional contact with the other ring of the bearing unit, performs its sealing function. A second metal shield is mounted in an axially external position with respect to the seal, which functions to protect the seal and constitutes a first barrier against external contaminants due to a labyrinth seal created between the shield and one of the rings of the bearing unit.

In the ventilation industry, bearing units may be able to work at high speeds, have low friction losses and, offer good resistance to external contaminants. Each of these three requirements, as regards to sealing devices, require solutions that are in principle not compatible with one another. For example, the need for low friction and high speed means that it is not possible to use several contacting lips or increase the pressure of said lips. Conversely, to ensure good sealing capacity, the presence of one or more contacting lips is undoubtedly important.

Currently, there are solutions which provide for the use of one or two metal shields which, being non-contacting, ensure on the one hand optimal performance in terms of low friction and high speed, but do not at the same time offer adequate performance in terms of sealing against external contaminants.

There is therefore a need to design a bearing unit comprising a sealing device which overcomes the abovementioned drawbacks.

The aim of the present disclosure is therefore to disclose a bearing unit, which does not have the abovementioned drawbacks. This aim is achieved by means of a new labyrinth sealing device, designed for use in the ventilation industry, which has the purpose of offering good resistance to contaminants while being devoid of contacting components (for example, elastomer coatings provided with contacting lips). The sealing device according to the present disclosure, as it has no contacting elements, at the same time ensures good performance in terms of low friction and high operating speeds.

According to the disclosure, the sealing device has three shaped shields, the geometry and arrangement of which makes it possible to create a very efficient labyrinth seal.

Therefore, the present disclosure provides a bearing unit, with a labyrinth sealing device, having the features set out in the appended claims.

BRIEF DESCRIPTION OF THE DRAWINGS

The disclosure will now be described with reference to the appended drawings which show some non-limiting embodiments thereof, in which.

DETAILED DESCRIPTION

Figure 1:
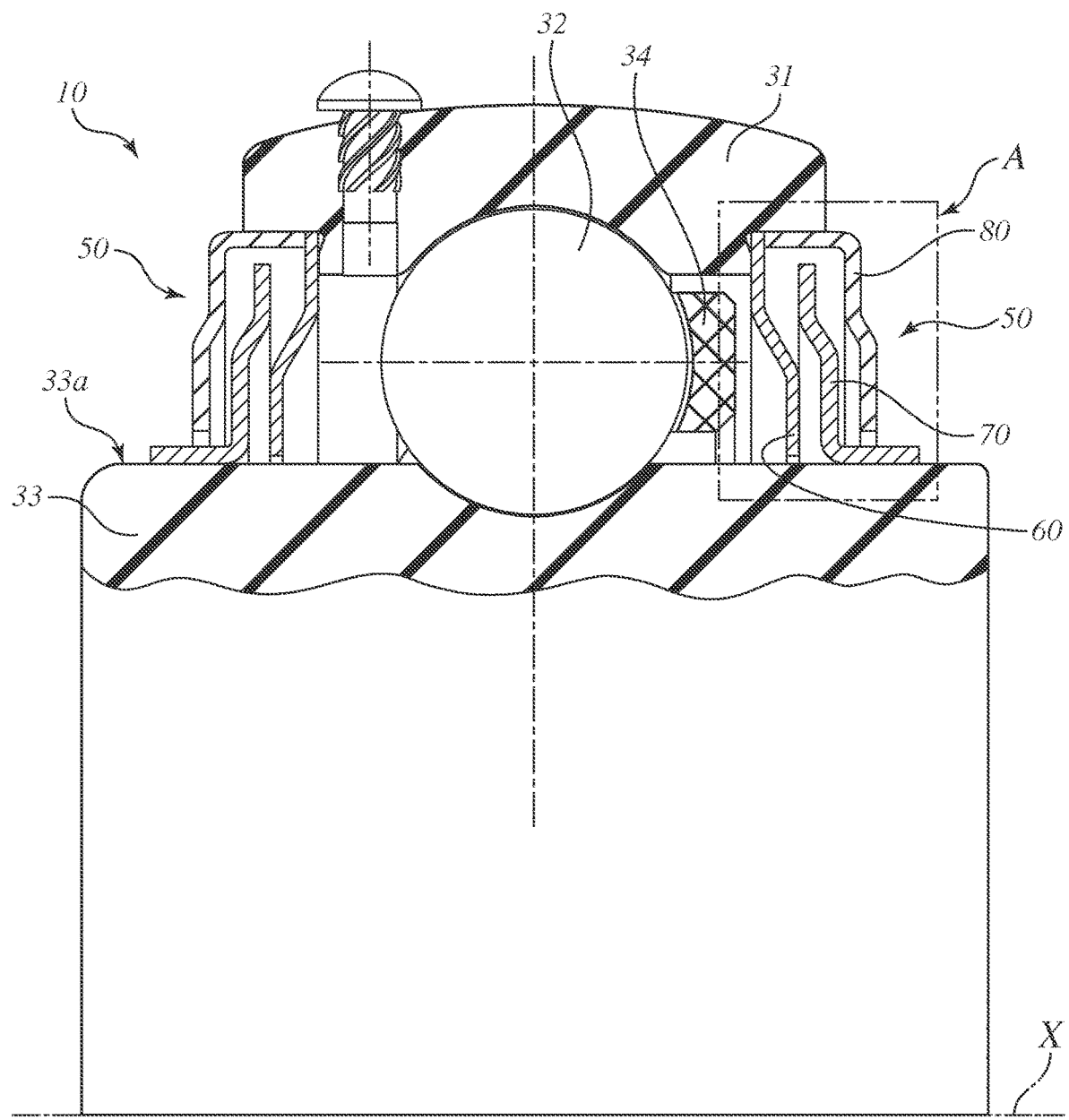
FIG. 1 is cross sectional view of an embodiment of the bearing unit according to the present disclosure.

With reference to FIG. 1, the reference sign 10 generally designates a bearing unit for use in manufacturing, and in particular in the ventilation industry. The bearing unit comprises a radially outer ring 31 that is preferably stationary; and a radially inner ring 33 that is preferably rotatable with respect to a central rotation axis X of the bearing unit 10. The radially inner ring 33 being rigidly secured to a rotating shaft by securing means of known type and therefore not shown in FIG. 1. The bearing unit 10 further comprises a row of rolling bodies 32, in this example balls, interposed between the radially outer ring 31 and the radially inner ring 33 to allow them to rotate relative to one another. Additionally, the bearing unit 10 comprises a cage 34 for holding the rolling elements, for keeping the rolling elements of the row of rolling bodies 32 in position.

Throughout the present description and in the claims, terms and expressions indicating positions and orientations such as "radial" and "axial" are intended with reference to the rotation axis X of the bearing unit 10 as shown in FIG. 1.

To simplify the graphical depiction, the reference sign 32 shall designate both individual rolling bodies and the row of rolling bodies. Again for the sake of simplicity, the term "ball" may be used by way of example in the present description and in the attached drawings instead of the more generic term "rolling body" (with the same numerical references also being used). Some embodiments and the related drawings may use rolling bodies other than balls, without this departing from the scope of the present disclosure.

Figure 2:
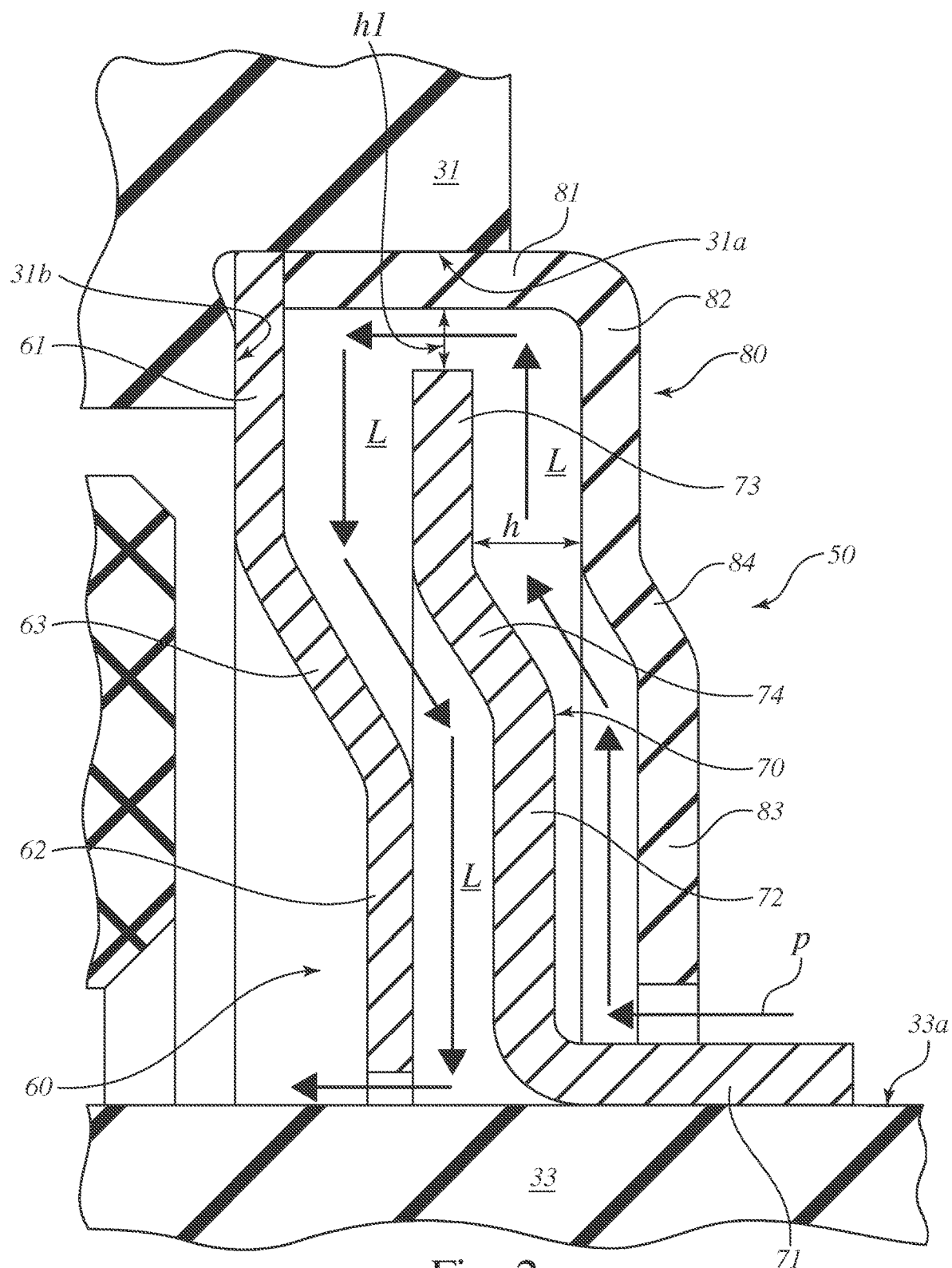
FIG. 2 is a perspective view of section "A" of the bearing unit as shown in FIG. 1.

Now turning to FIG. 2, the bearing unit 10 further may include a sealing device 50 or, preferably, a pair of sealing devices 50, located on opposite sides of the row of rolling bodies 32. Each sealing device 50 may include a first shield 60, a second shield 70, and a third shield 80, which are arranged axially in series with each other and are interposed between the radially outer ring and the radially inner ring.

The first shield 60 of the sealing device 50 being axially internal and mounted stably with interference on a radially internal surface 31a of the radially external ring 31. The first shield 60 may include, a first flange portion 61, a second flange portion 62, and an oblique portion 63 for connecting the two flange portions 61, 62. The first flange portion 61 being radially external and mounted by interference on the radially internal surface 31a of the radially outer ring 31; and the second flange portion 62 being radially internal and not contacting the radially external surface 33a of the radially inner ring 33.

The second shield 70 of the sealing device 50 being axially interposed between the first shield 60 and a third shield 80, and mounted steadily with interference on a radially external surface 33a of the radially inner ring 33. The second shield 70 in turn comprises, a cylindrical portion 71; a first flange portion 72; a second flange portion 73; and an oblique portion 74 for connecting the two flange portions 72, 73. The cylindrical portion 71 being radially internal, which realizes the coupling by interference with the radially external surface 33a of the radially inner ring 33. The first flange portion 72 being connected to the cylindrical portion 71. The second flange portion 73 being radially external and does not contact either the radially internal surface 31a of the radially external ring 31 or the third shield 80.

The third shield 80 of the sealing device 50 being axially external and mounted with interference on the radially internal surface 31a of the radially outer ring 31. The third shield 80 comprises a cylindrical portion 81; a first flange portion 82; a second flange portion 83; and an oblique portion 84 for connecting the two flange portions 82, 83. The cylindrical portion 81 being radially external which realizes the coupling by interference with the radially internal surface 31a of the radially outer ring 31. The first flange portion 82 being connected to the cylindrical portion 81; and the second flange portion 83 being radially internal and not contacting the cylindrical portion 71 of the second shield 70.

To sum up, the sealing device 50 may include two shields 60, 80 mounted with interference on the radially outer ring 31 and one shield 70 axially interposed between the first two shields 60 and 80 and mounted on the radially inner ring. These three shields are all non-contacting with respect to each other and with respect to the other ring to the ring on which they are respectively mounted.

This combination of these shields creates a long, narrow labyrinth L with many changes in direction, and therefore a path for external contaminants with significant head loss. Consequently, any contaminants that make it into the bearing unit, passing through the entire labyrinth L, will be negligible. In FIG. 2, the complex path for contaminants inside the labyrinth L is indicated with the symbol "p" and the associated arrows. The length of the path p is more than twice the length of a labyrinth produced in conventional sealing devices.

Correct sizing and assembly of this innovative sealing device 50 will further optimize its sealing performance while keeping the bulk of the entire bearing unit 10 within acceptable levels.

The first shield 60, axially internal, may be a metal strip of thickness not larger than 0.4 mm. As this is the shield which is axially most internal and therefore not in contact with the external environment, it does not need to be any larger.

The second 70 and the third shield 80 need to have a thickness greater than the thickness of the first shield 60, for example between 0.45 mm and 0.55 mm. The second and the third shield may be more resistant to possible damage and the action of contaminants as they are more exposed to the external environment.

The third shield 80, axially external, which is immobilized by interference in the radially outer ring 31, holds the first shield 60 in position against an axial surface 31b of the radially outer ring 31.

Since this third shield is the last to be mounted, it is useful for the first shield 60 to be mounted with a small degree of interference in the radially outer ring 31. This small degree of interference allows the first shield 60, axially internal, to stay in position during the assembly process. After the first shield 60 is mounted, the second shield 70 is mounted on the radially inner ring 33. During this step, the first shield 60 may stay in the correct position and since there is not yet anything keeping it pressed against the axial surface 31b of the radially outer ring 31, it is useful for there to be a small degree of interference with the radially outer ring 31.

To take into account of tolerances of the components and the assembly conditions, and thus to prevent the various shields from coming into contact with one another when in operation, the labyrinth L will not have a constant amplitude. Since the axial play is greater than the radial play within the bearing unit, the labyrinth will have an amplitude "h" in the axial direction, which is greater than the amplitude "h1" in the radial direction.

The amplitude "h" in the axial direction of the labyrinth L may be between 0.6 mm and 0.8 mm. This amplitude ensures that there is no contact between the components since it is sufficiently greater than the axial play, even within the limits of the manufacturing process.

Conversely, the amplitude "h1" in the radial direction of the labyrinth L may be between 0.45 mm and 0.65 mm. In this case too, the components may not come into contact. Lower values of the radial amplitude "h1" would involve the risk of contact between components, in particular between the second and third shields, since the latter deforms during mounting with interference on the radially outer ring.

The more or less inverted "L" shape of the third shield 80, axially internal, has the function, as seen above, of holding the first shield 60 in position, as the cylindrical portion 81 of the third shield 80 presses the first flange portion 61 of the first shield 60 against the radially outer ring.

Moreover, this inverted "L" shape completely and entirely seals the sealing device 50 against contaminants and/or washing water coming from an axially external or radially external direction, or a combination of the two directions.

Lastly, the oblique portions 63, 74, 84 of the three shields 60, 70, 80, respectively, which connect respective flange portions have the function of stiffening said shields. The oblique portions also help to further increase the path "p" of the labyrinth L.

Naturally, if it is necessary for the bearing unit 10 to be axially less bulky, it will be possible not to produce the shields with the oblique portions and simply connect the respective first and second flange portions to one another.

To sum up, the sealing device 50 according to the present disclosure provides a "contactless" sealing device, i.e. one without contacting elements (for example elastomer lips); a bearing unit 10 with a low frictional torque, due only to the internal geometry and the efficiency of the lubricant, but certainly without any contribution from the sealing devices; and the bearing unit 10 being able attain high operating speeds, as it does not include any contacting elements.

Note that, in addition to the embodiments of the disclosure described above, many other variants exist. It may also be understood that these embodiments are simply examples and do not limit the subject matter of the disclosure or its applications or its possible configurations. On the contrary, although the description above makes it possible for a person skilled in the art to implement the present disclosure at least according to one exemplary configuration thereof, it may be understood that many variations of the components described may be envisaged without thereby exceeding the subject matter of the disclosure as defined in the attached claims, interpreted literally and/or according to their legal equivalents.

We claim:

1. A bearing unit, comprising:
a radially outer ring,
a radially inner ring configured to rotate with respect to a rotation axis (X),
a row of rolling bodies interposed between the radially outer ring and the radially inner ring, and
at least one sealing device defining a sealing labyrinth (L);
wherein,
the at least one sealing device comprises a first shield, a second shield, and a third shield arranged axially in series with respect to each other and interposed between the radially outer ring and radially inner ring,
the first shield is axially internal and comprises a first flange portion mounted by interference on the radially internal surface of the radially outer ring, a second flange portion radially internal to the first flange portion, and an oblique portion connecting the first flange portion and the second flange portion, wherein the second flange portion is not contacting the radially external surface of the radially inner ring;
the second shield is axially interposed between the first shield and the third shield and is mounted with interference on the radially external surface of the radially inner ring, the second shield comprising a first flange portion, a second flange portion radially external to the first flange portion, and an oblique portion connecting the first flange portion and the second flange portion, wherein the second flange portion is not contacting the radially outer ring; and
the third shield is axially external and is mounted with interference on the radially internal surface of the radially outer ring, the third shield comprising a first flange portion, a second flange portion radially internal to the first flange portion, and an oblique portion connecting the first flange portion and the second flange portion, wherein the second flange portion is not contacting the second shield;
wherein the second shield and the third shield each comprise a thickness greater than a thickness of the first shield.

2. The bearing unit of claim 1, wherein the second shield comprises,
a cylindrical portion radially internal which realizes coupling by interference with the radially external surface of the radially inner ring.

3. The bearing unit of claim 1, wherein the third shield comprises,
a cylindrical portion radially external which realizes coupling by interference with the radially internal surface of the radially outer ring.

4. The bearing unit of claim 3 wherein the third shield holds the first shield in position against an axial surface of the radially outer ring.

5. The bearing unit of claim 1, wherein the first shield comprises a thickness not larger than 0.4 mm, and the second shield and the third shield comprise a thickness ranging between 0.45 mm and 0.55 mm.

6. The bearing unit of claim 1, wherein the labyrinth (L) comprises an amplitude in the axial direction (h) between 0.6 mm and 0.8 mm, and an amplitude in the radial direction (h1) between 0.45 mm and 0.65 mm.

* * * * *